(12) United States Patent
Takahashi et al.

(10) Patent No.: US 11,626,614 B2
(45) Date of Patent: Apr. 11, 2023

(54) NON-AQUEOUS ELECTROLYTE SECONDARY BATTERY

(71) Applicant: Panasonic Intellectual Property Management Co., Ltd., Osaka (JP)

(72) Inventors: Takahiro Takahashi, Osaka (JP); Tomoki Shiozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 236 days.

(21) Appl. No.: 16/543,779

(22) Filed: Aug. 19, 2019

(65) Prior Publication Data

US 2019/0386285 A1 Dec. 19, 2019

Related U.S. Application Data

(63) Continuation of application No. PCT/JP2017/043905, filed on Dec. 7, 2017.

(30) Foreign Application Priority Data

Feb. 27, 2017 (JP) .............................. JP2017-035528

(51) Int. Cl.
*H01M 50/531* (2021.01)
*H01M 10/0525* (2010.01)
(Continued)

(52) U.S. Cl.
CPC ..... *H01M 10/0525* (2013.01); *H01M 10/058* (2013.01); *H01M 50/534* (2021.01); *H01M 50/536* (2021.01); *H01M 50/538* (2021.01)

(58) Field of Classification Search
None
See application file for complete search history.

(56) References Cited

U.S. PATENT DOCUMENTS 9,508,703 B2 * 11/2016 Yu ....................... H01L 25/0657
2006/0093922 A1 5/2006 Kim et al.
(Continued)

FOREIGN PATENT DOCUMENTS

CN 1753204 A 3/2006
JP 2006-93147 A 4/2006
(Continued)

OTHER PUBLICATIONS

International Search Report dated Mar. 6, 2018, issued in counterpart Applicatino No. PCT/JP2017/043905 (2 pages).
(Continued)

*Primary Examiner* — Jonathan Crepeau
*Assistant Examiner* — Angela J Martin
(74) *Attorney, Agent, or Firm* — WHDA, LLP

(57) ABSTRACT

A positive electrode for this non-aqueous electrolyte secondary battery is provided with: a positive electrode current collector; a positive electrode active material layer formed on the positive electrode current collector; a positive electrode tab connected to an exposed portion at which the positive electrode current collector is exposed and on which the positive electrode active material layer is not formed; and a protective layer covering the exposed portion and the positive electrode tab on the exposed portion. The protective layer is composed of a base material including a curable resin.

8 Claims, 13 Drawing Sheets

(51) Int. Cl.
    *H01M 10/058*     (2010.01)
    *H01M 50/572*     (2021.01)
    *H01M 50/536*     (2021.01)
    *H01M 50/534*     (2021.01)
    *H01M 50/538*     (2021.01)

(56) References Cited

U.S. PATENT DOCUMENTS

| | | |
|---|---|---|
| 2009/0092859 A1 | 4/2009 | Kim |
| 2011/0081574 A1 | 4/2011 | Jo et al. |
| 2014/0120417 A1 | 5/2014 | Matsushita et al. |

FOREIGN PATENT DOCUMENTS

| | | | | |
|---|---|---|---|---|
| JP | 2009-252392 A | | 10/2009 | |
| JP | 2010-010117 | * | 1/2010 | .............. H01M 2/34 |
| JP | 2010-10117 A | | 1/2010 | |
| JP | 2011-77041 A | | 4/2011 | |
| JP | 2014-89856 A | | 5/2014 | |
| WO | 2013/047402 A1 | | 4/2013 | |
| WO | WO 2013047402 A | * | 4/2013 | .............. H01M 2/26 |

OTHER PUBLICATIONS

English Translation of Chinese Search Report dated Jan. 12, 2022, issued in counterpart CN application No. 201780082820.1. (2 pages).

* cited by examiner

NON-AQUEOUS ELECTROLYTE SECONDARY BATTERY

TECHNICAL FIELD

The present invention relates to a non-aqueous electrolyte secondary battery.

BACKGROUND ART

Conventionally, lithium secondary batteries with the improved insulating property of a positive electrode or a negative electrode by using a protective tape have been proposed.

Patent Literature 1 describes a lithium secondary battery that suppresses breakage of a collector at a portion where a collector and a lead are in contact with each other.

FIGS. 8A and 8B are configuration diagrams of a positive electrode of the lithium secondary battery described in Patent Literature 1, and FIG. 8A is a partial top plan view observed from one main surface side of the collector, and FIG. 8B is a sectional view along the line L1-L1 in FIG. 8A.

As shown in FIGS. 8A and 8B, the protective tape 27 covers the positive electrode current collector exposed surface 21a and the lead 25 on one main surface side of the positive electrode current collector 21A. For example, this protective tape 27 is a tape for preventing heat generation of the battery when the separator or the like is torn at the time of battery abnormality and the positive electrode and the negative electrode are in contact with each other. In addition, the protective layer 28 is disposed between one end of the lead 25 and the positive electrode current collector 21A, and the positive electrode mixture layer 21B is formed on both sides of the positive electrode current collector 21A.

Patent Literature 2 discloses a non-aqueous electrolyte secondary battery having an insulating member disposed in the exposed portion of a collector in which a positive electrode active material layer is not formed or the exposed portion of a collector in which a negative electrode active material layer is not formed.

CITATION LIST

Patent Literature

PATENT LITERATURE 1: Japanese Unexamined Patent Application Publication No. 2014-89856
PATENT LITERATURE 2: Japanese Unexamined Patent Application Publication No. 2009-252392

SUMMARY

The protective tape in Patent Literature 1 is a resin tape. The resin tape generally includes a substrate such as polyimide or polypropylene and an adhesive layer provided on the substrate.

For example, foreign matter (having conductivity) adheres to such a resin tape, one end of the foreign matter penetrates the resin tape and contacts the lead 25 (positive electrode tab) or the positive electrode current collector exposed surface 21a, and the other end of the foreign matter contacts the negative electrode, causing internal short circuit between the positive electrode and the negative electrode through the foreign matter to generate heat. Due to this heat generation, the insulating property of the substrate or the adhesive layer may be impaired, and the heat generation may continue.

An object of the present disclosure is to provide a non-aqueous electrolyte secondary battery capable of suppressing an increase in battery temperature after an internal short circuit due to contamination.

The non-aqueous electrolyte secondary battery according to one embodiment of the present disclosure comprises a positive electrode and a negative electrode; at least any one of the above-described positive electrode and the above-described negative electrode comprises a collector, an active material layer formed on the above-described collector, an electrode tab joined to an exposed portion where the above-described active material layer is not formed and the above-described collector is exposed, and a protective layer covering the above-described electrode tab on the above-described exposed portion and the above-described exposed portion; and the above-described protective layer includes a substrate comprising a curable resin.

The non-aqueous electrolyte secondary battery according to another aspect of the present disclosure comprises a positive electrode and a negative electrode; at least any one of the above-described positive electrode and the above-described negative electrode comprises a collector, an active material layer formed on the above-described collector, a protective layer covering a boundary portion between an exposed portion where the active material layer is not formed and the collector is exposed and the active material layer; and the above-described protective layer includes a substrate comprising a curable resin.

According to the present disclosure, a non-aqueous electrolyte secondary battery capable of suppressing an increase in battery temperature after an internal short circuit due to contamination can be provided.

DESCRIPTION OF EMBODIMENTS

Figure 1A:
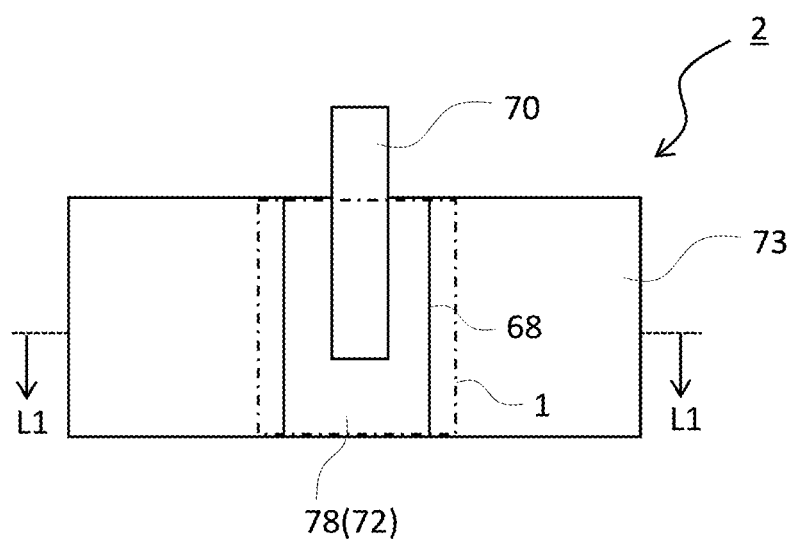
FIG. 1A is a schematic view showing the configuration of the positive electrode in the region A of FIG. 7.

Hereinafter, an example of the non-aqueous electrolyte secondary battery according to an aspect of the present disclosure will be described. The drawings referred to in the following description of the embodiments are schematically described, and the dimensional ratio of the component drawn in the drawings may be different from the actual one.

The non-aqueous electrolyte secondary battery, which is an example of the embodiments, comprises a positive electrode, a negative electrode, a separator provided between the positive electrode and the negative electrode, and a non-aqueous electrolyte. Specifically, the non-aqueous electrolyte secondary battery has a structure in which a container such as a battery can or a laminate houses the non-aqueous electrolyte and a wound electrode assembly in which the positive electrode and the negative electrode are wound via the separator. The electrode assembly is not limited to the wound electrode assembly, and another form of an electrode assembly may be applied such as a laminate electrode assembly in which the positive electrode and the negative electrode are laminated via the separator.

Figure 6:
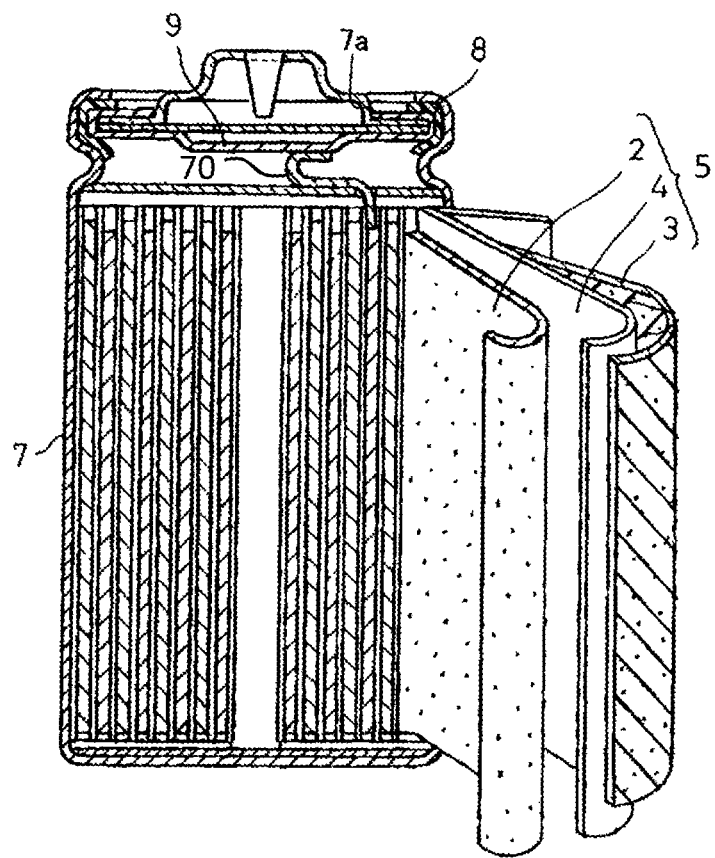
FIG. 6 is a longitudinal cross-sectional view typically showing the non-aqueous electrolyte secondary battery which is an example of embodiments.

FIG. 6 is a longitudinal cross-sectional view typically showing the non-aqueous electrolyte secondary battery which is an example of embodiments. This non-aqueous electrolyte secondary battery comprises the electrode assembly 5 in which the positive electrode 2 and the negative electrode 3 are spirally wound with the separator 4 interposed therebetween. The electrode assembly 5 comprising the positive electrode 2, the negative electrode 3, and the separator 4 is housed in the bottomed cylindrical battery case 7 having an opening, and a predetermined amount of an electrolytic solution (non-aqueous electrolyte) is injected into the battery case 7 to impregnate the electrode assembly 5 therewith. The opening of the battery case 7 is sealed in a sealed state by bending the opening of the battery case 7 radially inward and caulking it in a state where the sealing plate 9 having the gasket 8 attached to the peripheral portion is inserted. The positive electrode 2 of this non-aqueous electrolyte secondary battery comprises the positive electrode tab 70, and one end of the positive electrode tab 70 is joined to the exposed portion of the positive electrode current collector included in the positive electrode 2 as described in detail below. The positive electrode tab 70 extends outward of the peripheral portion of the positive electrode current collector, and the other end is connected to the sealing plate 9 by laser welding or the like.

Figure 7:
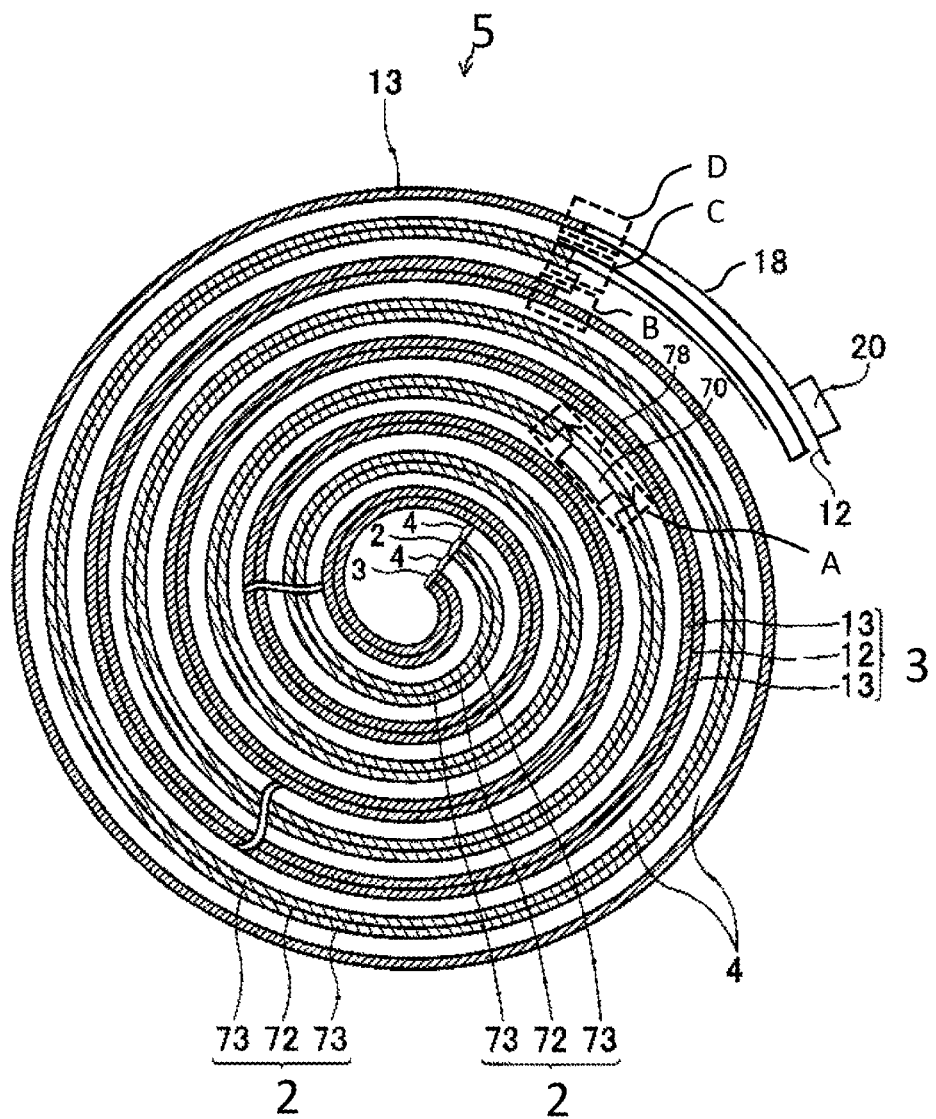
FIG. 7 is a partial transverse cross-sectional view of the electrode assembly used for the non-aqueous electrolyte secondary battery which is an example of embodiments.
Figure 8A:
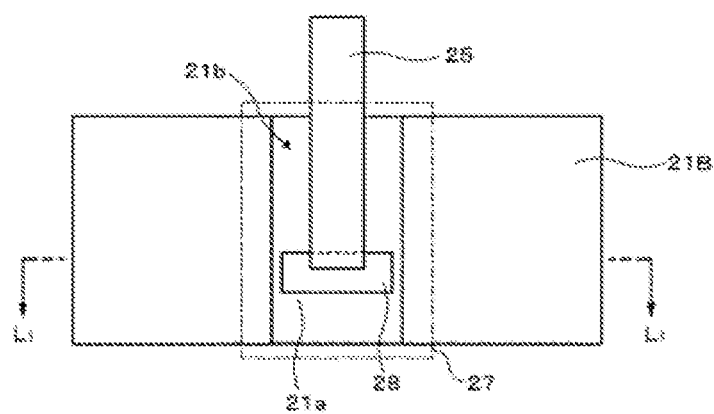
FIG. 8A is an explanatory view of a prior art.
Figure 8B:
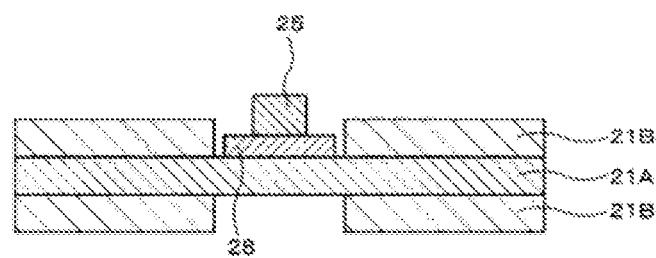
FIG. 8B is an explanatory view of a prior art.

FIG. 7 is a partial transverse cross-sectional view of the electrode assembly used for the non-aqueous electrolyte secondary battery which is an example of embodiments. In FIG. 7, the protective layer described below is omitted. The positive electrode 2 included in the electrode assembly 5 comprises the positive electrode current collector 72, the positive electrode active material layer 73 formed on the positive electrode current collector 72, the positive electrode tab 70, and the protective layer (not shown). The positive electrode current collector 72 has the exposed portion 78 where the positive electrode active material layer 73 is not formed. The exposed portion 78 is formed at the central longitudinal portion (region A in FIG. 7) of the positive electrode current collector 72 and at the longitudinal end portion (region C in FIG. 7) of the positive electrode current collector 72. The positive electrode tab 70 is joined to the exposed portion 78 formed at the central longitudinal portion of the positive electrode current collector 72. The negative electrode 3 included in the electrode assembly 5 comprises the negative electrode current collector 12, the negative electrode active material layer 13 formed on the negative electrode current collector 12, the negative electrode tab 20, and the protective layer (not shown). The negative electrode current collector 12 has the exposed portion 18 where the negative electrode active material layer 13 is not formed. The negative electrode tab 20 is joined to the exposed portion 18 at the longitudinal end portion of the negative electrode current collector 12.

In the electrodes (positive electrode 2 and negative electrode 3) shown in FIG. 7, for example, the protective layer covers the boundary portions between the exposed portion 78 of the region A and the positive electrode tab 70, and the active material layer (positive electrode active material layer 73 and negative electrode active material layer 13); and between the exposed portion of areas B to D (78, 18) and the active material layer (positive electrode active material layer 73 and negative electrode active material layer 13). Hereinafter, the electrode to which the protective layer is applied is described in detail.

Figure 1B:
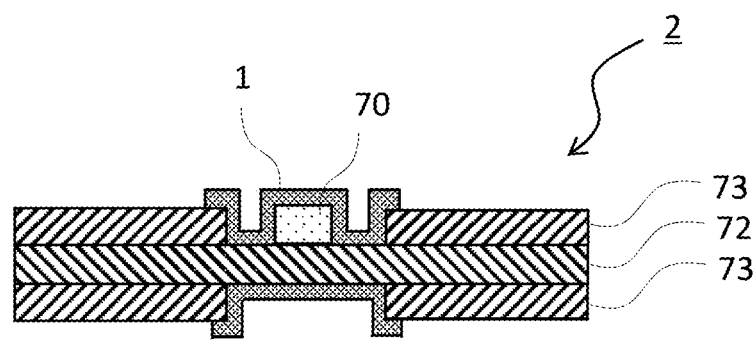
FIG. 1B is a schematic view showing the configuration of the positive electrode in the region A of FIG. 7.

FIGS. 1A and 1B are schematic views showing the configuration of the positive electrode in the region A of FIG. 7, FIG. 1A is a partial top view observed from one main surface side of the positive electrode, and FIG. 1B is a cross-sectional view along line L1-L1 in FIG. 1A.

The positive electrode 2 shown in FIGS. 1A and 1B comprises the positive electrode current collector 72 and the positive electrode active material layer 73 formed on the positive electrode current collector 72. In the positive electrode 2, the exposed portion 78 is formed where the positive electrode active material layer 73 is not formed and the positive electrode current collector 72 is exposed. The positive electrode 2 comprises the positive electrode tab 70, and the positive electrode tab 70 is joined to the exposed portion 78 on one main surface side of the positive electrode 2 by ultrasonic welding or the like.

The positive electrode 2 shown in FIGS. 1A and 1B comprises the protective layer 1. In FIG. 4A, in order to clarify the configuration of the electrode, the protective layer 1 is shown as a perspective diagram and is indicated by an alternate long and short dash line. The same applies to FIG. 2 and FIG. 3A below. The protective layer 1 covers the positive electrode tab 70 on the one main surface side of the exposed portion 78 and the exposed portion 78. The protective layer 1 is desirable to also cover the exposed portion 78 on the side opposite to the one main surface side. In the exposed portion 78, a part of the exposed portion 78 may be covered by the protective layer 1, and the entire surface of the exposed portion 78 is preferably covered by the protective layer 1, from the viewpoint of suppressing the occurrence of short circuit due to contamination. In the positive electrode 2 shown in FIGS. 1A and 1B, the protective layer 1 is also provided on the positive electrode active material layer 73 and also covers the boundary portion 68 between the exposed portion 78 and the positive electrode active material layer 73.

The protective layer 1 includes a substrate comprising a curable resin. That is, the protective layer 1 does not comprise a polyimide or an adhesive layer used in a conventional protective tape. In the protective layer 1, the substrate including the curable resin is disposed directly on the positive electrode tab 70 and the exposed portion 78 without the adhesive layer.

The protective layer 1 is formed by applying the curable resin and the resin solution including an optional curing agent, a photopolymerization initiator, or the like onto the positive electrode tab 70 and the exposed portion 78, and by heating the coating film or irradiating the coating film with ultraviolet light or the like.

The curable resin includes at least one of a thermosetting resin and a photocurable resin. The thermosetting resin is a resin cured by heating to exhibit electrical insulation, and examples thereof include bisphenol epoxy resin such as bisphenol A epoxy resin and bisphenol F epoxy resin; novolak epoxy resin such as naphthalene-containing novolac epoxy resin, trisphenolmethane epoxy resin, tetrakisphenol ethane epoxy resin, dicyclopentadiene epoxy resin, and phenol biphenyl epoxy resin; biphenyl epoxy resin such as tetramethylbiphenyl epoxy resin; polycyclic aromatic epoxy resin such as epoxy resin having naphthalene structure, epoxy resin having anthracene structure, and epoxy resin having pyrene structure; hydrogenated alicyclic epoxy resin such as hydrogenated bisphenol A epoxy resin; and mesogen skeleton epoxy resin such as terephthalylidene epoxy resin having a mesogen group as a skeleton. These thermosetting resins are used singly or in combinations of two or more. The photocurable resin is a resin cured by irradiation with high energy radiation such as ultraviolet light, visible light, electron beam, and X-ray to exhibit electrical insulation, and an example thereof includes one polymerized by mixing a lauryl acrylate/acrylic acid copolymer with an acrylic polyfunctional monomer (or oligomer) such as polyoxazoline, polyisocyanate, melamine resin, polycarbodiimide, polyol, and polyamine and by irradiating with ultraviolet ray or electron beam (heating as required).

Among these curable resins, novolac epoxy resin, polycyclic aromatic epoxy resin, and the like are preferable from the viewpoint of high heat resistance (for example, the insulating property can be maintained even in heating at 150° C.).

In the protective layer 1 (not including the inorganic material described below), the curable resin preferably has a content of 90% by weight or more, and more preferably 95% by weight or more with respect to the weight of the protective layer 1, from the viewpoint of improving the heat resistance of the protective layer 1. A curable resin can also have 100% by weight with respect to the weight of the protective layer 1 including no inorganic material.

In the present embodiments, foreign matter adheres on the protective layer 1 covering the positive electrode tab 70 on the exposed portion 78 and the exposed portion 78, one end of the foreign matter penetrates the protective layer 1 and contacts the positive electrode tab 70 of one side of the positive electrode 2 or the exposed portion 78, the other end of the foreign matter contacts the one side of the negative electrode 3, and thereby heat may be generated by internal short circuit. However, since the protective layer 1 includes a substrate comprising a curable resin, the insulating property can be maintained even after the above-described heat generation, and the continuation of internal short circuit is suppressed. Therefore, in the non-aqueous electrolyte secondary battery comprising the protective layer 1 of the present embodiments, the temperature rise of the non-aqueous electrolyte secondary battery after internal short circuit is suppressed, compared to a non-aqueous electrolyte secondary battery using a conventional protective tape.

Figure 2:
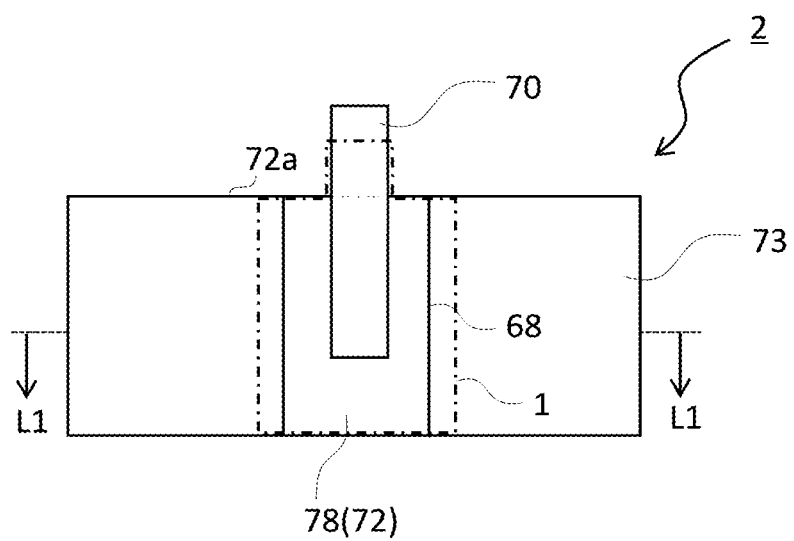
FIG. 2 is a schematic view showing another example of the configuration of the positive electrode in the region A of FIG. 7.

FIG. 2 is a schematic view showing another example of the configuration of the positive electrode in the region A of FIG. 7 and is a partial top view observed from one main surface side of the positive electrode. In the positive electrode 2 shown in FIG. 2, the protective layer 1 not only covers the positive electrode tab 70 on the exposed portion 78 and the exposed portion 78, but also is disposed on the positive electrode tab 70 extending outside of the peripheral portion 72a of the positive electrode current collector 72. When the positive electrode tab 70 extends outside of the peripheral portion 72a of the positive electrode current collector 72 and is connected to the sealing plate 9 shown in FIG. 6, the protective layer 1 is preferably provided also on at least a part of the positive electrode tab 70 between the peripheral portion 72a of the positive electrode current collector 72 and the sealing plate 9. However, the protective layer 1 is not preferably provided on the portion to be welded to the sealing plate 9 in the positive electrode tab 70 and the back surface thereof. The protective layer 1 may be disposed on one surface of the positive electrode tab 70 extending outside of the peripheral portion 72a of the positive electrode current collector 72, or may be disposed on the both surfaces.

The protective layer 1 includes a substrate comprising a curable resin and hence has a certain strength. Therefore, as shown in FIG. 2, the protective layer 1 is disposed on the positive electrode tab 70 extending outside of the peripheral portion 72a of the positive electrode current collector 72, allowing for the positive electrode tab 70 to be provided with strength and insulating property. In addition, the coating layer applied to the positive electrode is illustrated in FIGS. 1A, 1B and 2, and this may be replaced with the negative electrode. That is, the negative electrode tab on the exposed portion, the exposed portion, and the like may be covered by the coating layer.

Figure 3A:
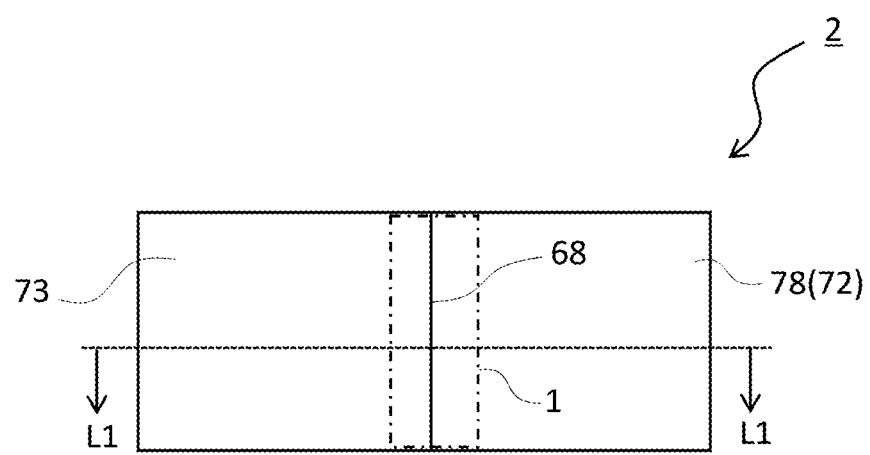
FIG. 3A is a schematic view showing an example of the configuration of the positive electrode in the region C of FIG. 7.
Figure 3B:
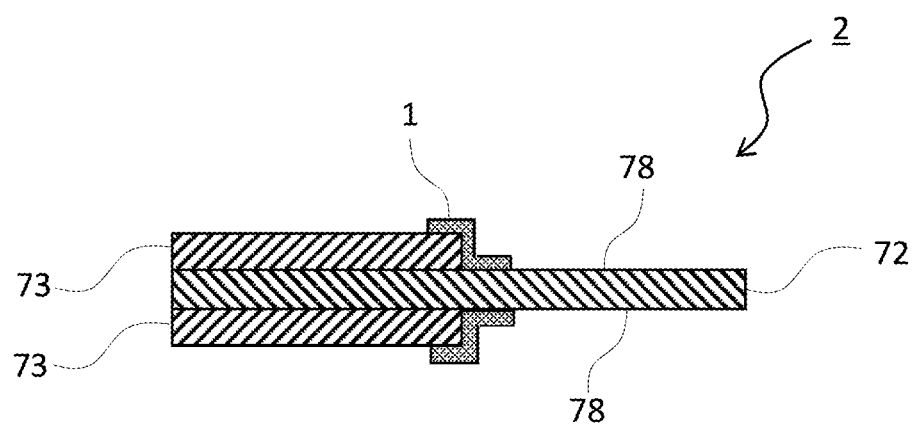
FIG. 3B is a schematic view showing an example of the configuration of the positive electrode in the region C of FIG. 7.
Figure 4A:
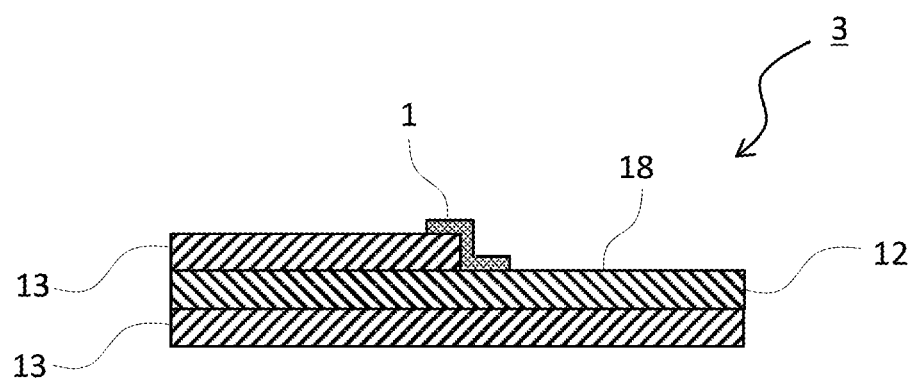
FIG. 4A is a sectional view showing an example of the configuration of the negative electrode in the region B and the region D of FIG. 7.

FIGS. 3A and 3B are schematic views showing an example of the configuration of the positive electrode in the region C of FIG. 7, FIG. 3A is a partial top view observed from one main surface side of the positive electrode, and FIG. 3B is a cross-sectional view along line L1-L1 in FIG. 3A. The protective layer 1 is provided on the positive electrode active material layer 73 and the exposed portion 78 of the positive electrode current collector 72 so as to cover the boundary portion 68 between the exposed portion 78 on the one main surface side and the surface side opposite to the one main surface side and the positive electrode active material layer 73.

In the present embodiments, foreign matter adheres on the protective layer 1 covering the boundary portion 68 between the exposed portion 78 and the positive electrode active material layer 73, one end of the foreign matter penetrates the protective layer 1 and contacts the exposed portion 78 of one side of the positive electrode 2, the other end of the foreign matter contacts the negative electrode 3, and thereby heat may be generated by internal short circuit. However, as described above, the insulating property by the protective layer 1 is maintained, thereby stopping the continuation of internal short circuit and suppressing the temperature rise of the non-aqueous electrolyte secondary battery after the internal short circuit.

Figure 4B:
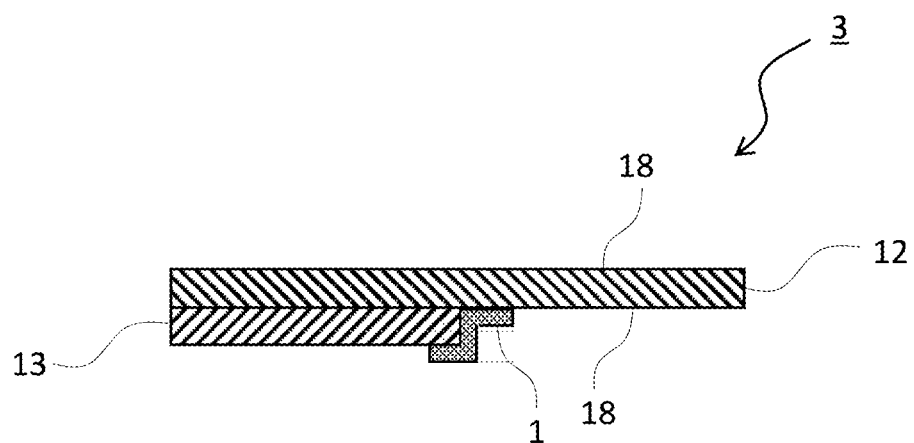
FIG. 4B is a sectional view showing an example of the configuration of the negative electrode in the region B and the region D of FIG. 7.

FIG. 4A is a sectional view showing an example of the configuration of the negative electrode in the region B of FIG. 7, and FIG. 4B is a sectional view showing an example of the configuration of the negative electrode in the region D of FIG. 7. As shown in FIG. 4A, the protective layer 1 is provided on the negative electrode active material layer 13 of one main surface side and the exposed portion 18 of the negative electrode current collector 12 so as to cover the boundary portion between the negative electrode active material layer 13 of the one main surface side and the exposed portion 18. As shown in FIG. 4B, the protective layer 1 is provided on the negative electrode active material layer 13 of the opposite surface side and the exposed portion 18 of the negative electrode current collector 12 so as to cover the boundary portion between the negative electrode active material layer 13 of the one main surface side and the opposite surface side and the exposed portion 18.

In the present embodiments, foreign matter adheres on the protective layer 1 covering the boundary portion between the exposed portion 18 and the negative electrode active material layer 13, one end of the foreign matter penetrates the protective layer 1 and contacts the exposed portion 18 of one side of the negative electrode 3, the other end of the foreign matter contacts the positive electrode 2, and thereby heat may be generated by internal short circuit. However, as described above, the insulating property by the protective layer 1 is maintained, thereby stopping the continuation of internal short circuit and suppressing the temperature rise of the non-aqueous electrolyte secondary battery after the internal short circuit.

Figure 5A:
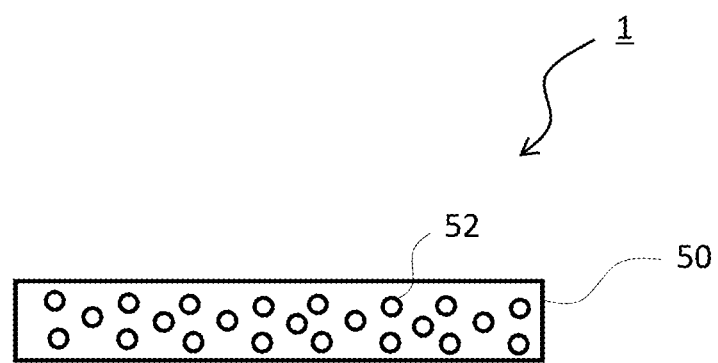
FIG. 5A is a partial schematic cross-sectional view of the protective layer including an inorganic material.
Figure 5B:
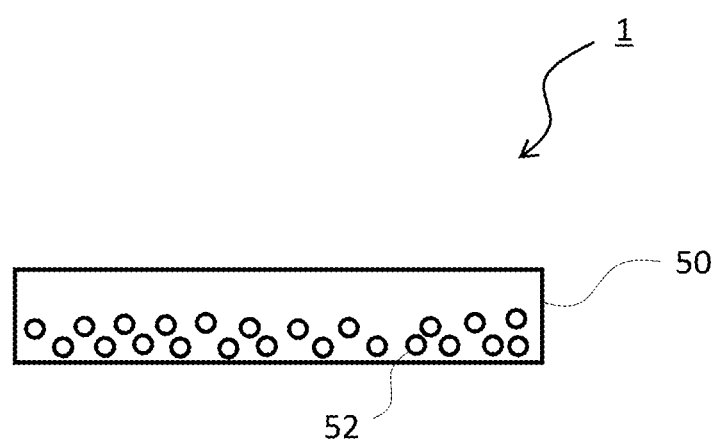
FIG. 5B is a partial schematic cross-sectional view of the protective layer including an inorganic material.

FIGS. 5A and 5B are partial schematic cross-sectional views of a protective layer including an inorganic material. The protective layer 1 shown in FIGS. 5A and 5B includes the substrate 50 including a thermosetting resin and the inorganic material 52. The inorganic material 52 may be uniformly dispersed in a predetermined powder shape inside the substrate 50 as shown in FIG. 5A, or may be concentrated in a predetermined powder shape on the inside of the substrate 50 as shown in FIG. 5B. When the inorganic material 52 is concentrated on the inside of the substrate 50, it is preferably concentrated on the side of the collector. The concentration of the inorganic material 52 on the side of the collector of the substrate 50 means that the content of the inorganic material 52 present in a range from the collector side surface (surface facing the exposed portion) of the substrate 50 to a half thickness of the substrate 50 is more than 50% by weight with respect to the total amount of the inorganic material 52 present in the substrate, and the content is preferably 65% by weight or more and more preferably 75% by weight or more. The method for concentrating the inorganic material 52 includes a method of preparing the curable resin solution A having a low content of the inorganic material 52 and the curable resin solution B having a high content of the inorganic material 52, applying the curable resin solution B onto the exposed portion or the electrode tab, and applying the curable resin solution A thereon.

A thermosetting resin and the substrate 50 including inorganic material 52 can be used as the protective layer 1, further improving the heat resistance and the strength of the protective layer 1. The inorganic material 52 can be concentrated on the collector side of the substrate 50, further improving the insulating property of the protective layer 1.

The inorganic material 52 includes at least one selected from the group consisting of a metal oxide, a metal nitride, a metal fluoride, and a metal carbide. Examples of the metal oxide include aluminum oxide, titanium oxide, zirconium oxide, silicon oxide, manganese oxide, magnesium oxide, and nickel oxide. Examples of the metal nitride include titanium nitride, boron nitride, aluminum nitride, magnesium nitride, and silicon nitride. Examples of the metal fluoride include aluminum fluoride, lithium fluoride, sodium fluoride, magnesium fluoride, calcium fluoride, barium fluoride, aluminum hydroxide, and boehmite. Examples of the metal carbide include silicon carbide, boron carbide, titanium carbide, and tungsten carbide. Among them, the inorganic material 52 preferably includes at least any one of $Al_2O_3$, $TiO_2$, $ZrO_2$, $SiO_2$, $MnO_2$, $MgO$, $Si_3N_4$, BN, and boehmite, from the viewpoint of non-conductivity, high melting point, and the like.

The content of the inorganic material 52 is preferably 5% by weight or more and 80% by weight or less, and more preferably 35% by weight or more and 80% by weight or less with respect to the weight of the protective layer 1, from the viewpoint of improving the heat resistance of the protective layer 1. In this case, the content of the curable resin is preferably 20% by weight or more and 80% by weight or less, and more preferably 20% by weight or more and 65% by weight or less with respect to the weight of the protective layer 1.

The thickness of the protective layer 1 is arbitrary and preferably 1 μm or more. When the thickness of the protective layer 1 is less than 1 μm, the heat resistance of the protective layer may be reduced. The protective layer including the inorganic material can be thinner than the protective layer including no inorganic material. The protective layer is thinner, allowing to alleviate distortion due to the thickness of the protective layer in the inside of the electrode assembly (having a structure, for example, in which the positive electrode and the negative electrode are wound via the separator). The protective layer including the inorganic material 52 can have a thickness of 30 μm or less. In Example 5 described below, the thickness of the protective layer was 25 μm.

In the non-aqueous electrolyte secondary battery according to the present embodiments, known materials can be used for the electrodes (positive electrode 2 and negative electrode 3) to which the above-described protective layer 1 is applied, the separator 4, and the non-aqueous electrolyte, and these examples are as follows.

<Positive Electrode>

The positive electrode current collector included in the positive electrode can use a metal foil that is stable in the potential range of the positive electrode such as aluminum, a film in which the metal is disposed on the surface layer, and the like. The positive electrode active material layer included in the positive electrode suitably includes a conductive agent and a binder in addition to the positive electrode active material. The positive electrode can be prepared by, for example, applying a positive electrode mixture slurry including the positive electrode active material, a binder, and the like onto the positive electrode current collector, drying the coating film, and rolling the film to form the positive electrode active material layer on the both sides of the positive electrode current collector.

Examples of the positive electrode active material include lithium transition metal complex oxide, and specifically, lithium cobalt oxide, lithium manganese oxide, lithium nickel oxide, lithium nickel manganese composite oxide, lithium nickel cobalt composite oxide, or the like can be used, and Al, Ti, Zr, Nb, B, W, Mg, Mo, or the like may be added to these lithium transition metal complex oxides.

As the conductive agent, carbon powders such as carbon black, acetylene black, ketjen black, graphite, and the like may be used singly or in combinations of two or more.

Examples of the binder include a fluorocarbon polymer and a rubber polymer. Examples of the fluorocarbon polymer include polytetrafluoroethylene (PTFE), polyvinylidene fluoride (PVdF), or modified products thereof, and examples of the rubber polymer include an ethylene-propylene-isoprene copolymer and an ethylene-propylene-butadiene copolymer, and they may be used singly or in combinations of two or more.

<Negative Electrode>

The negative electrode current collector included in the negative electrode can use a metal foil that is stable in the potential range of the negative electrode such as copper, a film in which the metal is disposed on the surface layer, and the like. In addition to the negative electrode active material, the negative electrode active material layer included in the negative electrode suitably includes a thickener and the binder. The negative electrode can be prepared by, for example, applying a negative electrode mixture slurry in which a negative electrode active material, a thickener, and a binder are dispersed in water at a predetermined weight ratio onto the negative electrode current collector, drying the coating film, and rolling the film to form the negative electrode active material layer on the both sides of the negative electrode current collector.

As the negative electrode active material, a carbon material capable of occluding and releasing lithium ions can be used, and in addition to graphite, hardly graphitic carbon, easy graphitic carbon, fibrous carbon, coke, and carbon black can be used. As a non-carbon material, silicon, tin, and alloys or oxides mainly containing them can be used.

As the binder, PTFE or the like can be used as in the case of the positive electrode, but a styrene-butadiene copolymer (SBR) or modified product thereof may be used. As the thickener, carboxymethyl cellulose (CMC) and the like can be used.

<Non-Aqueous Electrolyte>

As the non-aqueous solvent (organic solvent) of the non-aqueous electrolyte, carbonates, lactones, ethers, ketones, esters, and the like can be used, and two or more of these solvents can be used in admixture. For example, cyclic carbonates such as ethylene carbonate, propylene carbonate, and butylene carbonate; chain carbonates such as dimethyl carbonate, ethyl methyl carbonate, and diethyl carbonate; and mixed solvents of cyclic carbonates and chain carbonates can be used.

As the electrolyte salt of the non-aqueous electrolyte, $LiPF_6$, $LiBF_4$, $LiCF_3SO_3$, and the like and these mixtures can be used. The amount of electrolyte salt dissolved in the non-aqueous solvent can be, for example, 0.5 to 2.0 mol/L.

<Separator>

As the separator, a porous sheet and the like having ion permeability and insulating property is used. Specific examples of the porous sheet include microporous thin films, woven fabrics, and nonwoven fabrics. As the material of the separator, olefin resins such as polyethylene and polypropylene, cellulose, and the like are suitable. The separator may be a laminate having a cellulose fiber layer and a thermoplastic resin fiber layer such as an olefin resin. A multilayer separator including a polyethylene layer and a polypropylene layer may be used, and a separator applied with a material such as an aramid resin or a ceramic on the surface thereof may be used.

Examples will be described.

EXAMPLES

Example 1

Lithium nickel cobalt aluminum complex oxide of 100 parts by weight represented by $LiNi_{0.88}Co_{0.09}Al_{0.03}O_2$ as a positive electrode active material, acetylene black (AB) of 1 part by weight, and polyvinylidene fluoride (PVdF) of 1 part by weight were mixed, and an appropriate amount of N-methyl-2-pyrrolidone (NMP) was further added to prepare a positive electrode mixture slurry. The positive electrode mixture slurry was applied to both sides of the positive electrode current collector consisting of an aluminum foil and dried. This was cut into a predetermined electrode size and rolled using a roller to prepare a positive electrode in which the positive electrode active material layer was formed on both sides of the positive electrode current collector. The crystal structure of $LiNi_{0.88}Co_{0.09}Al_{0.03}O_2$ is a layered rock salt structure (hexagonal crystal, space group R3-m). An exposed portion where the positive electrode current collector was exposed was formed without forming the positive electrode active material layer at substantially the central portion in the longitudinal direction of the positive electrode and the positive electrode tab of aluminum was fixed to the exposed portion by ultrasonic welding.

On the other hand, the negative collector was a thin copper foil, and graphite terminal, carboxymethyl cellulose (CMC) as a thickener, and styrene-butadiene rubber (SBR) as a binder are dispersed in water at a weight ratio of 98:1:1 to prepare a negative electrode mixture slurry, and the slurry was applied to both sides of the collector, dried, and compressed by a roll press so as to obtain a predetermined thickness. An exposed portion where the negative electrode current collector was exposed was formed without the negative electrode active material layer being formed at the end portion in the longitudinal direction of the negative electrode, and the negative electrode tab of nickel was fixed to the exposed portion by ultrasonic welding.

A resin solution including a photocurable resin was applied to the positive electrode tab on the exposed portion and the exposed portion, and ultraviolet ray was irradiated to form a protective layer covering the positive electrode tab on the exposed portion and the exposed portion. As the photocurable resin, methyl methacrylate and a lauryl acrylate/acrylic acid copolymer were used. The thickness of the protective layer was 32 μm.

The prepared positive electrode plate and negative electrode plate were spirally wound through the separator to prepare a wound electrode assembly. As the separator used, a filler of polyamide and alumina was dispersed in one surface of a polyethylene microporous film to form a heat resistant layer.

The electrode assembly was accommodated in a bottomed cylindrical battery case main body having an outer diameter of 18 mm and a height of 65 mm; $LiPF_6$ was added so as to be 1 mol/L in a mixed solvent in which ethylene carbonate (EC), ethyl methyl carbonate (EMC), and diethyl carbonate (DEC) were mixed at a volume ratio of 3:3:4; the obtained non-aqueous electrolyte was injected; and the opening of the battery case main body was sealed with a gasket and a sealing body to prepare a cylindrical non-aqueous electrolyte secondary battery of 18650 type.

Example 2

The procedure was the same as in Example 1, except that a resin solution including a thermosetting resin was applied to the positive electrode tab on the exposed portion and the exposed portion and heated at 50° C. to form a protective layer covering the positive electrode tab on the exposed portion and the exposed portion. As the thermosetting resin, the mixture of bisphenol A epoxy resin and a polyamide was used. The thickness of the protective layer was 32 μm. Curing the thermosetting resin according to Example 2 at a temperature of about 130° C. can improve the heat resistance.

Example 3

The procedure was the same as in Example 1, except that a resin solution including a thermosetting resin and an inorganic material was applied to the positive electrode tab on the exposed portion and the exposed portion and heated at 50° C. to form a protective layer covering the positive electrode tab on the exposed portion and the exposed portion. As the thermosetting resin, the mixture of bisphenol A epoxy resin and a polyamide was used. As the inorganic material, aluminum oxide ($Al_2O_3$) was used. The inorganic material had a center particle size of 0.5 μm. The thickness of the protective layer was 32 μm.

Example 4

The procedure was the same as in Example 1, except that a resin solution including a thermosetting resin and an inorganic material was applied to the positive electrode tab on the exposed portion and the exposed portion and heated at 50° C. to form a protective layer covering the positive electrode tab on the exposed portion and the exposed portion. As the thermosetting resin, the mixture of bisphenol A epoxy resin and a polyamide was used. As the inorganic material, titanium oxide ($TiO_2$) was used. The inorganic material of the protective layer had a center particle size of 0.5 μm. The thickness was 32 μm.

Example 5

A non-aqueous electrolyte secondary battery was prepared in the same manner as in Example 3, except that the thickness of the protective layer was 25.0 pun.

Comparative Example 1

The procedure was the same as in Example 1 except that the positive electrode tab on the exposed portion and the exposed portion were covered with the insulating tape. The insulating tape comprised a substrate (thickness of 25 μm) consisting of polyimide resin and an adhesive layer (thickness of 7 μm) consisting of an acrylic adhesive provided on the substrate, and the adhesive layer was contact with the positive electrode tab and the exposed portion.

Comparative Example 2

The procedure was the same as in Example 1 except that the positive electrode tab on the exposed portion and the exposed portion were covered with the insulating tape. The insulating tape comprised a substrate (thickness 25 μm) consisting of polypropylene resin and an adhesive layer (thickness 7 μm) consisting of a butyl rubber adhesive provided on the substrate, and the adhesive layer was contact with the positive electrode tab and the exposed portion.

With respect to the non-aqueous electrolyte secondary battery obtained as described above, the battery temperature at foreign matter short circuit was measured. The battery temperature at foreign matter short circuit was measured by placing a foreign matter (nickel piece) on the insulating tape and measuring the temperature of the side of the battery with a thermocouple at forced short circuit according to JIS C 8714. In this case, however, a severe test was performed using a nickel piece having a larger size instead of a standard test using a nickel piece having a standard size. The nickel piece was placed between the protective layer or the insulating tape and the separator so that the small piece penetrated the protective layer or the insulating tape. At this time, the highest attainable temperature of the battery side surface was measured with a thermocouple. Table 1 shows the results of Examples 1 to 5 and Table 2 shows the results of Comparative Examples 1 and 2.

(Nickel Piece Used in Standard Test)
L-shape (angle 90°) with a height of 0.2 mm, a width of 0.1 mm, and a side of 1 mm
(Nickel Small Piece Used in Severe Test)
L-shape (angle 90°) with a height of 0.2 mm, a width of 0.1 mm, and a side of 2 mm.

TABLE 1

| | Protective layer | | | Battery temperature at foreign matter short circuit (° C.) |
|---|---|---|---|---|
| | Thickness (μm) | Resin | Inorganic material | |
| Example 1 | 32.0 | Photocurable resin | — | 40 |
| Example 2 | 32.0 | Thermosetting resin | — | 40 |
| Example 3 | 32.0 | Thermosetting resin | Alumina | 30 |
| Example 4 | 32.0 | Thermosetting resin | Titania | 30 |
| Example 5 | 25.0 | Thermosetting resin | Alumina | 40 |

TABLE 2

| | Protective tape | | | | Battery temperature at foreign matter short circuit (° C.) |
|---|---|---|---|---|---|
| | Substrate | | Adhesive layer | | |
| | Thickness (μm) | Resin | Inorganic material | Thickness (μm) | Adhesive |
| Comparative Example 1 | 25.0 | Polyimide | — | 7.0 | Acrylic | 100 |
| Comparative Example 2 | 25.0 | Polypropylene | — | 7.0 | Acrylic | 100 |

The battery temperature at foreign material short circuit in Examples 1 to 5 was 40° C. or less. On the other hand, the battery temperature at foreign matter short circuit in Comparative Examples 1 and 2 was 100° C. The protective layers used in Examples 1 to 5 were maintained the insulating property even after heat generation at internal short circuit, and the heat generation was suppressed at a temperature of 40° C. or less. Examples 3 and 4 using the protective layer including the substrate including the curable resin and the inorganic material indicated a foreign matter short circuit battery temperature lower than Examples 1 and 2 in which the substrate did not include the inorganic material. In Example 5 using the protective layer including the substrate including the curable resin and the inorganic material, the thickness of the protective layer was thinner than the other Examples, and the battery temperature at foreign matter short circuit was equal to that in Examples 1 and 2. It is assumed that this is because the heat resistance of the protective layer was improved by the presence of the inorganic material.

The non-aqueous electrolyte secondary battery of the present embodiments can be applied to a drive power source of a mobile information terminal such as a mobile phone, a notebook computer, a smartphone, a tablet terminal, particularly, an application requiring a high energy density. In addition, applications such as electric vehicles (EV), hybrid electric vehicles (HEV or PHEV), and power tools are also possible.

REFERENCE SIGNS LIST

1 protective layer
2 positive electrode
3 negative electrode
4 separator
5 electrode assembly
7 battery case
8 gasket
9 sealing plate
12 negative electrode current collector
13 negative electrode active material layer
18 exposed portion
20 electrode tab
50 substrate
52 inorganic material
68 boundary portion
70 positive electrode tab
72 positive electrode current collector
72a peripheral portion
73 positive electrode active material layer
78 exposed portion

The invention claimed is:

1. A non-aqueous electrolyte secondary battery comprising
a positive electrode and a negative electrode,
wherein at least any one of the positive electrode and the negative electrode comprises a collector, an active material layer formed on the collector, an electrode tab joined to an exposed portion where the active material layer is not formed and the collector is exposed, and a protective layer covering the electrode tab on the exposed portion and the exposed portion, and
the protective layer includes a substrate comprising a curable resin,
wherein the substrate included in the protective layer comprises an inorganic material,
wherein the inorganic material comprises at least any one of $Al_2O_3$, $TiO_2$, $ZrO_2$, $SiO_2$, $MnO_2$, $MgO$, $Si_3N_4$, $BN$, and boehmite; and
wherein the inorganic material in the substrate is concentrated on a side of the collector, such that more than 50% by weight of the inorganic material in the substrate is present within half a thickness of the substrate from a surface of the substrate facing the collector.

2. The non-aqueous electrolyte secondary battery according to claim 1, wherein the electrode tab extends outside of a peripheral portion of the collector, and the protective layer is also provided on at least a part of the electrode tab extending.

3. The non-aqueous electrolyte secondary battery according to claim 1, comprising a battery case accommodating the positive electrode and the negative electrode, an opening of the battery case and a sealing plate sealing the opening,
wherein the electrode tab extends outside of a peripheral portion of the collector and is contact with the sealing plate, and the protective layer is provided on at least a part of the electrode tab between a peripheral portion of the collector and the sealing plate.

4. A non-aqueous electrolyte secondary battery comprising
a positive electrode and a negative electrode,
wherein at least any one of the positive electrode and the negative electrode comprises a collector, an active material layer formed on the collector, and a protective layer covering a boundary portion between an exposed portion where the active material layer is not formed and the collector is exposed and the active material layer,
the exposed portion is disposed at a longitudinal end of the current collector, and
the protective layer includes a substrate comprising a curable resin,
wherein the substrate included in the protective layer comprises an inorganic material,
wherein the inorganic material comprises at least any one of $Al_2O_3$, $TiO_2$, $ZrO_2$, $SiO_2$, $MnO_2$, $MgO$, $Si_3N_4$, $BN$, and boehmite; and
wherein the inorganic material in the substrate is concentrated on a side of the collector, such that more than 50% by weight of the inorganic material in the substrate is present within half a thickness of the substrate from a surface of the substrate facing the collector.

5. The non-aqueous electrolyte secondary battery according to claim 1, wherein the curable resin comprises at least any one of a thermosetting resin and a photocurable resin.

6. The non-aqueous electrolyte secondary battery according to claim 4, wherein the curable resin comprises at least any one of a thermosetting resin and a photocurable resin.

7. The non-aqueous electrolyte secondary battery according to claim 1, wherein the protective layer is electrically insulative.

8. The non-aqueous electrolyte secondary battery according to claim 4, wherein the protective layer is electrically insulative.

* * * * *